United States Patent
Lee

(10) Patent No.: US 11,304,242 B2
(45) Date of Patent: Apr. 12, 2022

(54) ELECTRONIC DEVICE CHANGING IDENTIFICATION INFORMATION BASED ON STATE INFORMATION AND ANOTHER ELECTRONIC DEVICE IDENTIFYING IDENTIFICATION INFORMATION

(71) Applicant: Samsung Electronics Co., Ltd, Suwon-si (KR)

(72) Inventor: Jaewoong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/693,087

(22) Filed: Nov. 22, 2019

(65) Prior Publication Data

US 2020/0170054 A1    May 28, 2020

(30) Foreign Application Priority Data

Nov. 23, 2018    (KR) .................. 10-2018-0146713

(51) Int. Cl.
*H04W 76/11*    (2018.01)
*H04L 12/28*    (2006.01)
(Continued)

(52) U.S. Cl.
CPC .......... *H04W 76/11* (2018.02); *H04L 12/282* (2013.01); *H04L 12/2809* (2013.01);
(Continued)

(58) Field of Classification Search
CPC ............. H04W 76/11; H04W 12/003; H04W 12/00503; H04W 4/80; H04W 8/005;
(Continued)

(56) References Cited

U.S. PATENT DOCUMENTS 10,374,804 B2    8/2019 Lee et al.
10,389,863 B2    8/2019 Jeon et al.
(Continued)

FOREIGN PATENT DOCUMENTS

CN       102299729 A      12/2011
KR    10-2016-0030797 A    3/2016
(Continued)

OTHER PUBLICATIONS

Notification of Transmittal of the International Search Report and the Written Opinion of the International Searching Authority, or the Declaration dated Mar. 12, 2020 in connection with International Patent Application No. PCT/KR2019/016073, 12 pages.

*Primary Examiner* — Eugene Yun

(57) ABSTRACT

An electronic device according to one embodiment disclosed in the disclosure includes a communication circuit for supporting wireless communication in a specified manner, a processor, and a memory for storing instructions, wherein when the instructions are executed, the processor searches an external device when the wireless communication in the specified manner is activated, receives, from the external device, first identification information that is a value unique to the external device and second identification information including a first portion including a name of the external device and a second portion including state information of the external device, and determines the state information of the external device based at least partially on the second portion when the first identification information corresponds to information stored in the memory.

12 Claims, 8 Drawing Sheets

(51) Int. Cl.
*H04W 4/80* (2018.01)
*H04W 8/00* (2009.01)
*H04L 67/54* (2022.01)
*H04W 12/50* (2021.01)
*H04W 12/63* (2021.01)

(52) U.S. Cl.
CPC .......... *H04L 12/2814* (2013.01); *H04L 67/24* (2013.01); *H04W 4/80* (2018.02); *H04W 8/005* (2013.01); *H04W 12/50* (2021.01); *H04W 12/63* (2021.01)

(58) Field of Classification Search
CPC .. H04W 84/18; H04L 12/282; H04L 12/2814; H04L 67/24; H04L 12/2809
USPC ......................................................... 455/41.2
See application file for complete search history.

(56) References Cited

U.S. PATENT DOCUMENTS

| | | |
|---|---|---|
| 10,484,477 B2 | 11/2019 | Nasir et al. |
| 2015/0213138 A1 | 7/2015 | Lee et al. |
| 2017/0134553 A1 | 5/2017 | Jeon et al. |
| 2017/0195424 A1 | 7/2017 | Nasir et al. |
| 2018/0063695 A1 | 3/2018 | Kim |
| 2018/0067712 A1* | 3/2018 | Behzadi ................ G06F 13/128 |
| 2018/0124552 A1* | 5/2018 | Cho ................... G06K 9/00671 |
| 2018/0204385 A1 | 7/2018 | Sarangdhar et al. |

FOREIGN PATENT DOCUMENTS

| | | |
|---|---|---|
| KR | 10-1662177 B1 | 10/2016 |
| KR | 10-2018-0024503 A | 3/2018 |

* cited by examiner

ELECTRONIC DEVICE CHANGING IDENTIFICATION INFORMATION BASED ON STATE INFORMATION AND ANOTHER ELECTRONIC DEVICE IDENTIFYING IDENTIFICATION INFORMATION

CROSS-REFERENCE TO RELATED APPLICATION

This application is based on and claims priority under 35 U.S.C. § 119 to Korean Patent Application No. 10-2018-0146713 filed on Nov. 23, 2018 in the Korean Intellectual Property Office, the disclosure of which is incorporated by reference herein in its entirety.

BACKGROUND

1. Field

The disclosure relates to a wireless communication method between electronic devices and an electronic device supporting the same.

2. Description of Related Art

An electronic device such as a smartphone, a tablet PC, or a laptop PC may perform various functions by executing applications. For example, the electronic device may execute a call app, a browser app, a video app, a music app, or a game app to perform a function of voice call, web search, video play, music play, or real time game play.

The electronic device may establish a communication channel with an external device (e.g., a wearable device or an IoT device) via wireless communication (e.g., Bluetooth or Wi-Fi). The electronic device may transmit and receive data of a sound, an image, or a control signal through the communication channel.

The above information is presented as background information only to assist with an understanding of the disclosure. No determination has been made, and no assertion is made, as to whether any of the above might be applicable as prior art with regard to the disclosure.

SUMMARY

When an electronic device according to the prior art is connected to an external device (e.g., a wearable device and an IoT device) via wireless communication, after being paired to the external device, the electronic device receives state information (e.g., battery information or volume information) of the external device. In this case, there is an inconvenience for a user to wait for a pairing process to identify simple device state information such as to identify battery capacity.

In addition, when there are a plurality of external devices to be connected to the electronic device, the electronic device receives state information of each of the external devices after being sequentially paired to the external devices. Thus, the user may not quickly identify an operating state of a peripheral device.

Aspects of the disclosure are to address at least the above-mentioned problems and/or disadvantages and to provide at least the advantages described below. Accordingly, an aspect of the disclosure is to provide an electronic device according to one embodiment disclosed in the disclosure includes a communication circuit for supporting wireless communication in a specified manner, a processor, and a memory for storing instructions, wherein when the instructions are executed, the processor searches an external device when the wireless communication in the specified manner is activated, receives, from the external device, first identification information that is a value unique to the external device and second identification information including a first portion including a name of the external device and a second portion including state information of the external device, and determines the state information of the external device based at least partially on the second portion when the first identification information corresponds to information stored in the memory.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

In the description of the drawings, the same or similar reference numerals may be used for the same or similar components.

DETAILED DESCRIPTION

Figure 1:
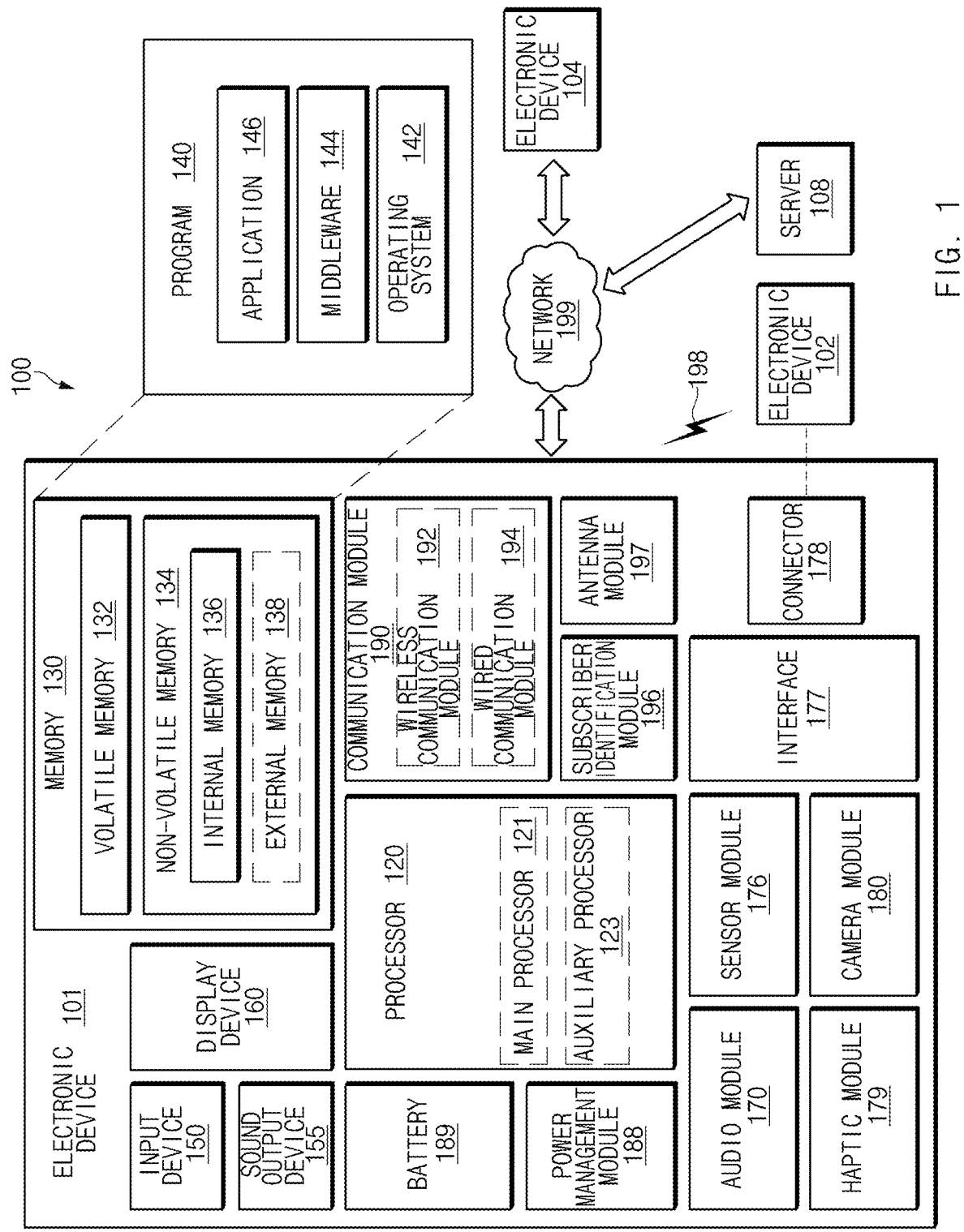
FIG. 1 illustrates a block diagram of an electronic device in a network environment according to various embodiments.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

FIG. 1 illustrates a block diagram of an electronic device 101 in a network environment 100 according to various embodiments. Referring to FIG. 1, the electronic device 101 may communicate with an electronic device 101a through a first network 198 (e.g., a short-range wireless communication network) or may communicate with an electronic device 101b or a server 103 through a second network 199 (e.g., a long-distance wireless communication network) in a network environment 100. According to an embodiment, the electronic device 101 may communicate with the electronic device 101b through the server 103. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, or an antenna module 197. According to some embodiments, at least one (e.g., the display device 160 or the camera module 180) among components of the electronic device 101 may be omitted or one or more other components may be added to the electronic device 101. According to some embodiments, some of the above components may be implemented with one integrated circuit. For example, the sensor module 176 (e.g., a fingerprint sensor, an iris sensor, or an illuminance sensor) may be embedded in the display device 160 (e.g., a display).

The processor 120 may execute, for example, software (e.g., a program 140) to control at least one of other components (e.g., a hardware or software component) of the electronic device 101 connected to the processor 120 and may process or compute a variety of data. According to an embodiment, as a part of data processing or operation, the processor 120 may load a command set or data, which is received from other components (e.g., the sensor module 176 or the communication module 190), into a volatile memory 132, may process the command or data loaded into the volatile memory 132, and may store result data into a nonvolatile memory 134. According to an embodiment, the processor 120 may include a main processor 121 (e.g., a central processing unit or an application processor) and an auxiliary processor 123 (e.g., a graphic processing device, an image signal processor, a sensor hub processor, or a communication processor), which operates independently from the main processor 121 or with the main processor 121. Additionally or alternatively, the auxiliary processor 123 may use less power than the main processor 121, or is specified to a designated function. The auxiliary processor 123 may be implemented separately from the main processor 121 or as a part thereof.

The auxiliary processor 123 may control, for example, at least some of functions or states associated with at least one component (e.g., the display device 160, the sensor module 176, or the communication module 190) among the components of the electronic device 101 instead of the main processor 121 while the main processor 121 is in an inactive (e.g., sleep) state or together with the main processor 121 while the main processor 121 is in an active (e.g., an application execution) state. According to an embodiment, the auxiliary processor 123 (e.g., the image signal processor or the communication processor) may be implemented as a part of another component (e.g., the camera module 180 or the communication module 190) that is functionally related to the auxiliary processor 123.

The memory 130 may store a variety of data used by at least one component (e.g., the processor 120 or the sensor module 176) of the electronic device 101. For example, data may include software (e.g., the program 140) and input data or output data with respect to commands associated with the software. The memory 130 may include the volatile memory 132 or the nonvolatile memory 134.

The program 140 may be stored in the memory 130 as software and may include, for example, a kernel 142, a middleware 144, or an application 146.

The input device 150 may receive a command or data, which is used for a component (e.g., the processor 120) of the electronic device 101, from an outside (e.g., a user) of the electronic device 101. The input device 150 may include, for example, a microphone, a mouse, a keyboard, or a digital pen (e.g., a stylus pen).

The sound output device 155 may output a sound signal to the outside of the electronic device 101. The sound output device 155 may include, for example, a speaker or a receiver. The speaker may be used for general purposes, such as multimedia play or recordings play, and the receiver may be used for receiving calls. According to an embodiment, the receiver and the speaker may be either integrally or separately implemented.

The display device 160 may visually provide information to the outside (e.g., the user) of the electronic device 101. For example, the display device 160 may include a display, a hologram device, or a projector and a control circuit for controlling a corresponding device. According to an embodiment, the display device 160 may include a touch circuitry configured to sense the touch or a sensor circuit (e.g., a pressure sensor) for measuring an intensity of pressure on the touch.

The audio module 170 may convert a sound and an electrical signal in dual directions. According to an embodiment, the audio module 170 may obtain the sound through the input device 150 or may output the sound through the sound output device 155 or an external electronic device (e.g., the electronic device 101a (e.g., a speaker or a headphone)) directly or wirelessly connected to the electronic device 101.

The sensor module 176 may generate an electrical signal or a data value corresponding to an operating state (e.g., power or temperature) inside or an environmental state (e.g., a user state) outside the electronic device 101. According to an embodiment, the sensor module 176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 177 may support one or more designated protocols to allow the electronic device 101 to connect directly or wirelessly to the external electronic device (e.g., the electronic device 101a). According to an embodiment, the interface 177 may include, for example, an HDMI (high-definition multimedia interface), a USB (universal serial bus) interface, an SD card interface, or an audio interface.

A connecting terminal 178 may include a connector that physically connects the electronic device 101 to the external electronic device (e.g., the electronic device 101a). According to an embodiment, the connecting terminal 178 may include, for example, an HDMI connector, a USB connector, an SD card connector, or an audio connector (e.g., a headphone connector).

The haptic module 179 may convert an electrical signal to a mechanical stimulation (e.g., vibration or movement) or an electrical stimulation perceived by the user through tactile or kinesthetic sensations. According to an embodiment, the haptic module 179 may include, for example, a motor, a piezoelectric element, or an electric stimulator.

The camera module 180 may shoot a still image or a video image. According to an embodiment, the camera module 180 may include, for example, at least one or more lenses, image sensors, image signal processors, or flashes.

The power management module 188 may manage power supplied to the electronic device 101. According to an embodiment, the power management module 188 may be implemented as at least a part of a power management integrated circuit (PMIC).

The battery 189 may supply power to at least one component of the electronic device 101. According to an embodiment, the battery 189 may include, for example, a non-rechargeable (primary) battery, a rechargeable (secondary) battery, or a fuel cell.

The communication module 190 may establish a direct (e.g., wired) or wireless communication channel between the electronic device 101 and the external electronic device (e.g., the electronic device 101a, the electronic device 101b, or the server 103) and support communication execution through the established communication channel. The communication module 190 may include at least one communication processor operating independently from the processor 120 (e.g., the application processor) and supporting the direct (e.g., wired) communication or the wireless communication. According to an embodiment, the communication module 190 may include a wireless communication module (or a wireless communication circuit) 192 (e.g., a cellular communication module, a short-range wireless communication module, or a GNSS (global navigation satellite system) communication module) or a wired communication module 194 (e.g., an LAN (local area network) communication module or a power line communication module). The corresponding communication module among the above communication modules may communicate with the external electronic device through the first network 198 (e.g., the short-range communication network such as a Bluetooth, a Wi-Fi direct, or an IrDA (infrared data association)) or the second network 199 (e.g., the long-distance wireless communication network such as a cellular network, an internet, or a computer network (e.g., LAN or WAN)). The above-mentioned various communication modules may be implemented into one component (e.g., a single chip) or into separate components (e.g., chips), respectively. The wireless communication module 192 may identify and authenticate the electronic device 101 using user information (e.g., international mobile subscriber identity (IMSI)) stored in the subscriber identification module 196 in the communication network, such as the first network 198 or the second network 199.

The antenna module 197 may transmit or receive a signal or power to or from the outside (e.g., an external electronic device). According to an embodiment, the antenna module may include one antenna including a radiator made of a conductor or conductive pattern formed on a substrate (e.g., a PCB). According to an embodiment, the antenna module 197 may include a plurality of antennas. In this case, for example, the communication module 190 may select one antenna suitable for a communication method used in the communication network such as the first network 198 or the second network 199 from the plurality of antennas. The signal or power may be transmitted or received between the communication module 190 and the external electronic device through the selected one antenna. According to some embodiments, in addition to the radiator, other parts (e.g., a RFIC) may be further formed as a portion of the antenna module 197.

At least some components among the components may be connected to each other through a communication method (e.g., a bus, a GPIO (general purpose input and output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 101 and the external electronic device 101b through the server 103 connected to the second network 199. Each of the electronic devices 101a and 101b may be the same or different types as or from the electronic device 101. According to an embodiment, all or some of the operations performed by the electronic device 101 may be performed by one or more external electronic devices among the external electronic devices 101a, 101b, or 103. For example, when the electronic device 101 performs some functions or services automatically or by request from a user or another device, the electronic device 101 may request one or more external electronic devices to perform at least some of the functions related to the functions or services, in addition to or instead of performing the functions or services by itself. The one or more external electronic devices receiving the request may carry out at least a part of the requested function or service or the additional function or service associated with the request and transmit the execution result to the electronic device 101. The electronic device 101 may provide the result as is or after additional processing as at least a part of the response to the request. To this end, for example, a cloud computing, distributed computing, or client-server computing technology may be used.

Figure 2:
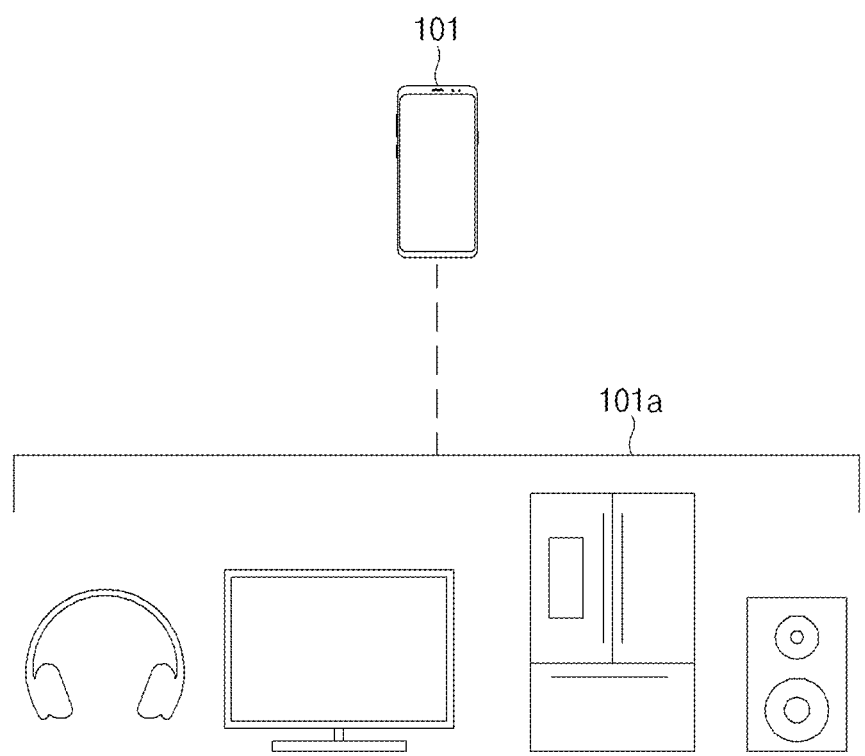
FIG. 2 illustrates wireless communication between a first electronic device and a second electronic device according to various embodiments.

FIG. 2 illustrates wireless communication between a first electronic device and a second electronic device according to various embodiments.

Referring to FIG. 2, a first electronic device 101 may be connected to a second electronic device 101a via a wireless communication in a specified manner. For example, the first electronic device 101 may be connected to the second electronic device 101a via Bluetooth communication or Wi-Fi communication.

The first electronic device 101 may be a device for managing the second electronic device 101a. For example, the first electronic device 101 may execute an application which manages the second electronic device 101a. The first electronic device 101 may determine an operation state or setting state (hereinafter, state information) of the second electronic device 101a based on information received from the second electronic device 101a. The first electronic device 101 may update a user interface of the application based on the determined state information.

The second electronic device 101a may be a wearable device (e.g., a smart watch, a smart band, or a smart glass) or an IoT device (e.g., a TV, a speaker, a refrigerator, a boiler, or the like) operated under control of the first electronic device 101.

According to one embodiment, when the specified communication scheme is activated, the first electronic device 101 may search for peripheral electronic devices (e.g., the second electronic device 101a). The first electronic device 101 may receive identification information of the second electronic device 101a from the second electronic device 101a. The identification information according to various embodiments may be, for example, identification information which combines a device name and state information. The identification information may be configured based on a rule shared between the first electronic device 101 and the second electronic device 101a. The rule may be stored in advance, or shared and stored when the first electronic device 101 and the second electronic device 101a are initially registered (or linked). The first electronic device 101 may display related information through the user interface using the received identification information.

Figure 3A:
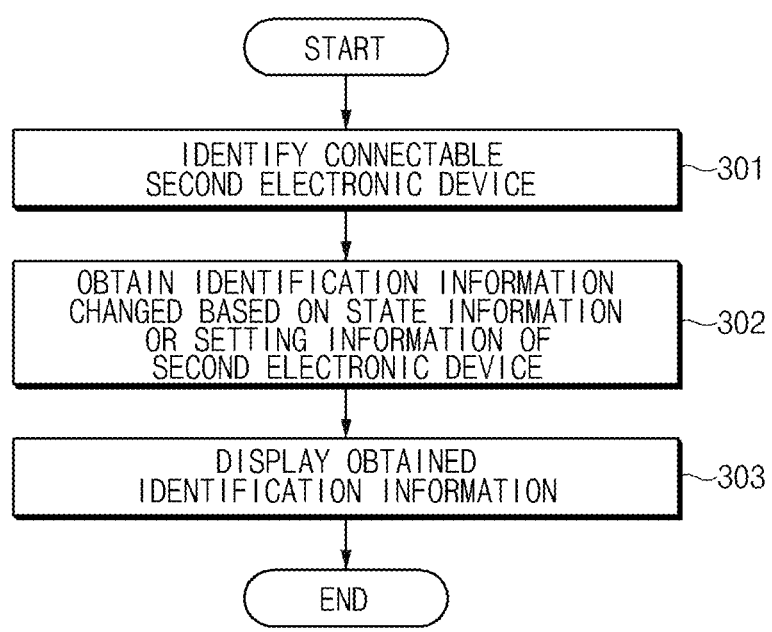
FIG. 3A illustrates a flowchart of a wireless communication method according to a first embodiment.

FIG. 3A illustrates a flowchart illustrating a wireless communication method according to a first embodiment.

Referring to FIG. 3A, in operation 301, the processor 120 of the first electronic device 101 may identify the second electronic device 101a connectable using the communication module 190. For example, the second electronic device 101a may be the IoT device or the wearable device around the first electronic device 101.

In operation 302, the processor 120 of the first electronic device 101 may obtain identification information changed based on at least one of the state information of the second electronic device 101a recognized by the sensor module of the second electronic device 101a or the setting information of the second electronic device 101a.

For example, when the second electronic device 101a is an earphone device, the state information or setting information may be battery information or volume information of the earphone device. In another example, when the second electronic device 101a is a refrigerator, the state information or setting information may be current temperature, set temperature, and door open/close information of the refrigerator. For another example, when the second electronic device 101a is an air conditioner, the state information or setting information may be on/off state or set temperature of the air conditioner, or indoor temperature.

In operation 303, the processor 120 of the first electronic device may display the obtained identification information using the display device 160 (e.g., the display). The user may immediately recognize a name and a current state of the peripheral device based on the displayed identification information.

Figure 3B:
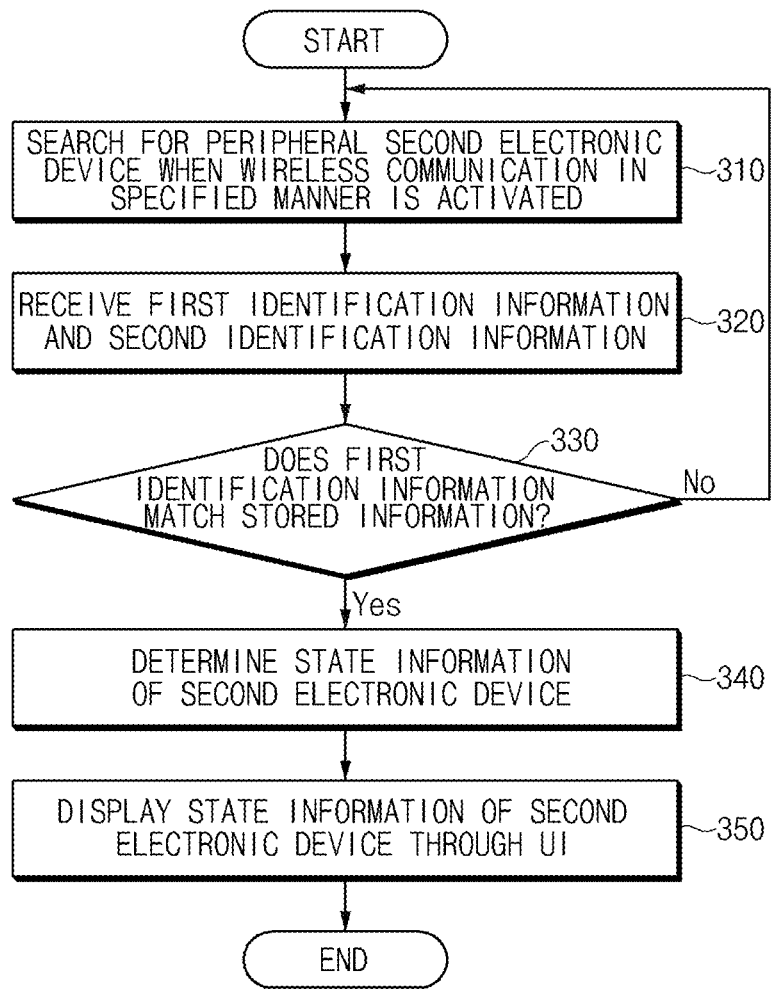
FIG. 3B illustrates a flowchart of a wireless communication method according to a second embodiment.

FIG. 3B illustrates a flowchart illustrating a wireless communication method according to a second embodiment.

Referring to FIG. 3B, in operation 310, the processor 120 of the first electronic device may search for the peripheral second electronic device 101a when the wireless communication in the specified manner is activated. For example, the specified manner may be the short-range wireless communication (e.g., the Bluetooth communication or the Wi-Fi communication).

According to various embodiments, when a specified application is executed, the processor 120 may search for the peripheral second electronic device 101a. For example, the application may be an application for controlling the IoT device (e.g., the TV, the speaker, or the refrigerator). For another example, the application may be an application for controlling the wearable device (e.g., the smart watch, the smart glass, or the smart band). In another example, the application may be an application related to network setting (e.g., a setting application for turning on/off the Bluetooth or Wi-Fi).

In operation 320, the processor 120 may receive first identification information and second identification information from the second electronic device 101a via the communication module (or the communication circuit) 190.

The first identification information may be a fixed value based on hardware characteristics included in the second electronic device 101a. In one embodiment, the first identification information may be an address value uniquely set for a chip that supports the wireless communication in the specified manner. For example, the first identification information may be an address value uniquely set for a communication chip supporting the Bluetooth communication/Wi-Fi communication.

According to one embodiment, when the first electronic device 101 and the second electronic device 101a have a history of being registered in advance, the first identification information of the second electronic device 101a may be stored in the memory 130 of the first electronic device 101.

The second identification information may be a value determined based on software characteristics of the second electronic device 101a. The second identification information may include a first portion including a name of the second electronic device 101a and a second portion including the state information of the second electronic device 101a.

According to one embodiment, the first portion may be a device name (e.g., My Headset) set to distinguish the second electronic device 101a from other peripheral devices. The device name may be set by a manufacturer or by user input.

According to one embodiment, the second portion may be text indicating the state information of the second electronic device 101a based on a predetermined rule.

For example, when the second electronic device 101a is the earphone device, the state information may be the battery information or the volume information of the earphone device. In another example, when the second electronic device 101a is the refrigerator, the state information may be the current temperature, the set temperature, and the door open/close information of the refrigerator. For another example, when the second electronic device 101a is the air conditioner, the state information may be the on/off state or the set temperature of the air conditioner, or the indoor temperature.

According to one embodiment, the second portion may include a plurality of state indications of different attributes. For example, the second portion may be text (e.g., Vol_30%_Bat_Low) in which the volume information and the battery information are continuously indicated.

According to various embodiments, when there are a plurality of second electronic devices 101a, the processor 120 may receive the first identification information and the second identification information from the plurality of second electronic device 101a, respectively.

In operation 330, the processor 120 may determine whether the first identification information (e.g., a Bluetooth address) matches information stored in the memory 130. When the first electronic device 101 and the second electronic device 101a have the previous history of being registered, the first identification information of the second electronic device 101a may be stored in advance in the memory 130 of the first electronic device 101.

In operation 340, when the first identification information matches the information stored in the memory 130, the processor 120 may determine the state information of the second electronic device 101a based on the second portion of the second identification information. For example, the processor 120 may analyze the second portion of the second identification information based on a specified rule. The rule may be the same as the rule used to generate the second portion in the second electronic device.

According to one embodiment, the rule may be stored in advance at a time when the first electronic device 101 is manufactured. According to another embodiment, when the first electronic device 101 and the second electronic device 101a have the history of being registered in advance, the rule may be downloaded from an external server or received and stored from the second electronic device 101a.

According to various embodiments, in operation 350, the processor 120 may display the determined state information of the second electronic device 101a through an object of the user interface. For example, when the battery state of the second electronic device 101a is determined to be Low, the processor 120 may display a graph about a battery power level corresponding to the Low.

According to various embodiments, the processor 120 may display the state information of the second electronic device 101a separate from establishing the wireless communication in the specified manner. For example, the processor 120 may display the state information (e.g., battery information or volume information) of the second electronic device 101a through the user interface before establishing the wireless communication using the first identification information (e.g., the Bluetooth address).

In another example, the processor 120 may establish the wireless communication using the first identification information (e.g., the Bluetooth address), and at the same time, display the state information (e.g., the battery information or volume information) of the second electronic device 101a. through the user interface. In another example, the processor 120 may display the state information (e.g., the battery information or volume information) of the second electronic device 101a through the user interface, but may not establish the wireless communication using the first identification information (e.g., the Bluetooth address).

Figure 4A:
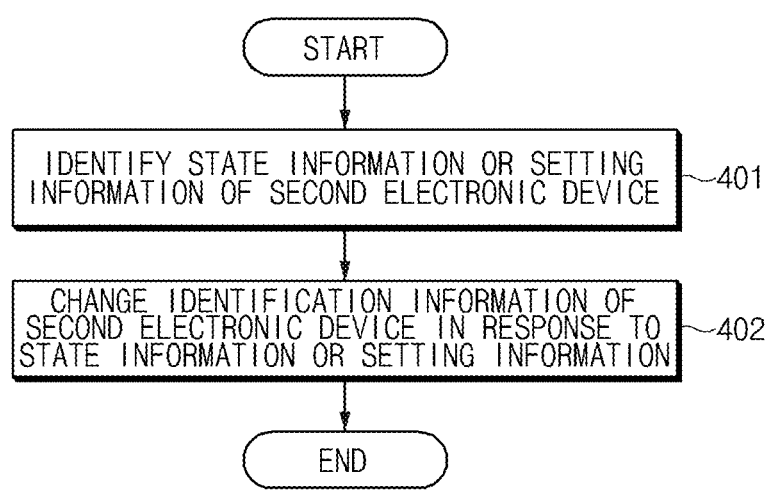
FIG. 4A illustrates a flowchart of a wireless communication method in a second electronic device according to a first embodiment.

FIG. 4A illustrates a flowchart illustrating a wireless communication method in a second electronic device according to a first embodiment.

Referring to FIG. 4A, in operation 401, the second electronic device 101a (e.g., a processor or a control circuit of the second electronic device 101a) may identify the state information of the second electronic device 101a recognized using the sensor module or the setting information of the second electronic device 101a.

For example, when the second electronic device 101a is the earphone device, the state information or the setting information may be the battery information or the volume information of the earphone device. In another example, when the second electronic device 101a is the refrigerator, the state information or the setting information may be the current temperature, the set temperature, and the door open/close information of the refrigerator. For another example, when the second electronic device 101a is the air conditioner, the state information or the setting information may be the on/off state or the set temperature of the air conditioner, or the indoor temperature.

In operation 402, the second electronic device 101a may change the identification information of the second electronic device 101a in response to the state information or setting information. The identification information may be identified before an external device (e.g., the first electronic device 101 of FIG. 1) establishes a connection with the second electronic device 101a.

For example, the second electronic device 101a may change the identification information of the second electronic device 101a to include a battery percentage (e.g., BAT_80% and BAT_30%). As another example, the second electronic device 101a may change the identification information of the second electronic device 101a into a form of indicating a battery grade (e.g., BAT_High, BAT_Mid, and BAT_Low).

According to various embodiments, the second electronic device 101a may broadcast a connection request signal including the changed identification information to the surroundings. The second electronic device 101a may perform pairing with the external device (e.g., the first electronic device 101 of FIG. 1) responding to the connection request signal.

Figure 4B:
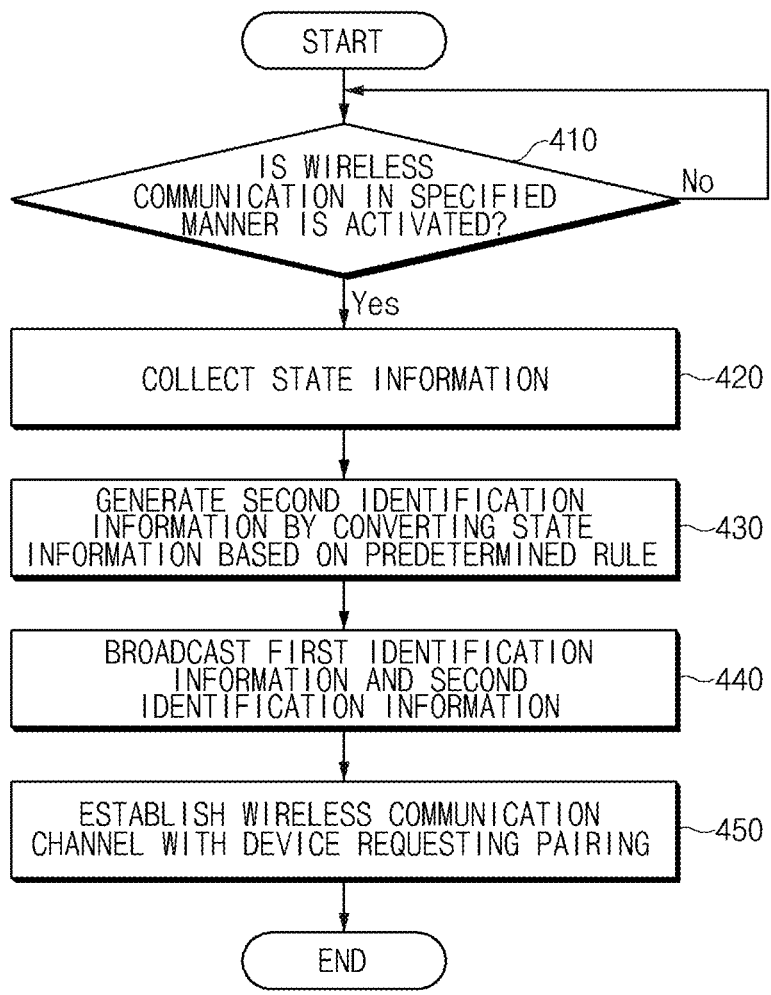
FIG. 4B illustrates a flowchart of a wireless communication method in a second electronic device according to a second embodiment.

FIG. 4B illustrates a flowchart illustrating a wireless communication method in a second electronic device according to a second embodiment.

Referring to FIG. 4B, in operation 410, the second electronic device 101a (e.g., the processor or the control circuit of the second electronic device 101a) may determine whether the wireless communication in the specified manner is activated. For example, the specified manner may be the short-range wireless communication (e.g., the Bluetooth communication or Wi-Fi communication).

In operation 420, when the wireless communication in the specified manner is activated, the second electronic device 101a may collect the state information (e.g., door open state, door closed state, current temperature, set temperature, battery information, or volume information). The second electronic device 101*a* may collect the state information based on a specified condition. For example, the second electronic device 101*a* may collect the state information in a power-on state. For another example, the second electronic device 101*a* may collect the state information based on a specified period.

In operation 430, the second electronic device 101*a* may generate the second identification information by converting the collected state information based on the predetermined rule.

For example, the second electronic device 101*a* may generate a second portion that indicates the battery information as the percentage (e.g., BAT_80% and BAT_30%). As another example, the second electronic device 101*a* may generate a second portion that indicates the battery information as the grade (e.g., BAT_High, BAT_Mid, and BAT_Low). The second electronic device 101*a* may generate the second identification information by combining the previously stored first portion and the second portion in which the state information is reflected.

According to one embodiment, the rule about the generation of the second portion may be stored in advance in the second electronic device 101*a* at the time of manufacture. Alternatively, the rule may be downloaded and stored from the external server.

According to another embodiment, when the second electronic device 101*a* has a history of being paired with the first electronic device 101, the rule may be received and stored from the first electronic device 101 in a previous pairing process.

According to various embodiments, operations 420 and 430 may be performed before operation 410. The second electronic device 101*a* may collect the state information and store the second identification information regardless of whether the wireless communication in the specified manner is activated.

In operation 440, the second electronic device 101*a* may broadcast the first identification information and the second identification information. According to one embodiment, the first identification information may be the fixed value based on the hardware characteristics included in the second electronic device 101*a*. The second identification information may be the value determined based on the software characteristics of the second electronic device 101*a*. The second identification information may include the first portion including the name of the second electronic device 101*a* and the second portion including the state information of the second electronic device 101*a*.

According to various embodiments, the second electronic device 101*a* may encrypt and broadcast the first identification information and the second identification information to the first electronic device 101 that has undergone initial device registration.

According to one embodiment, in operation 450, when the first electronic device 101 requests pairing, data may be transmitted and received via the wireless communication in the specified manner. The first electronic device 101 may receive a sound, an image, or a control signal.

Figure 5:
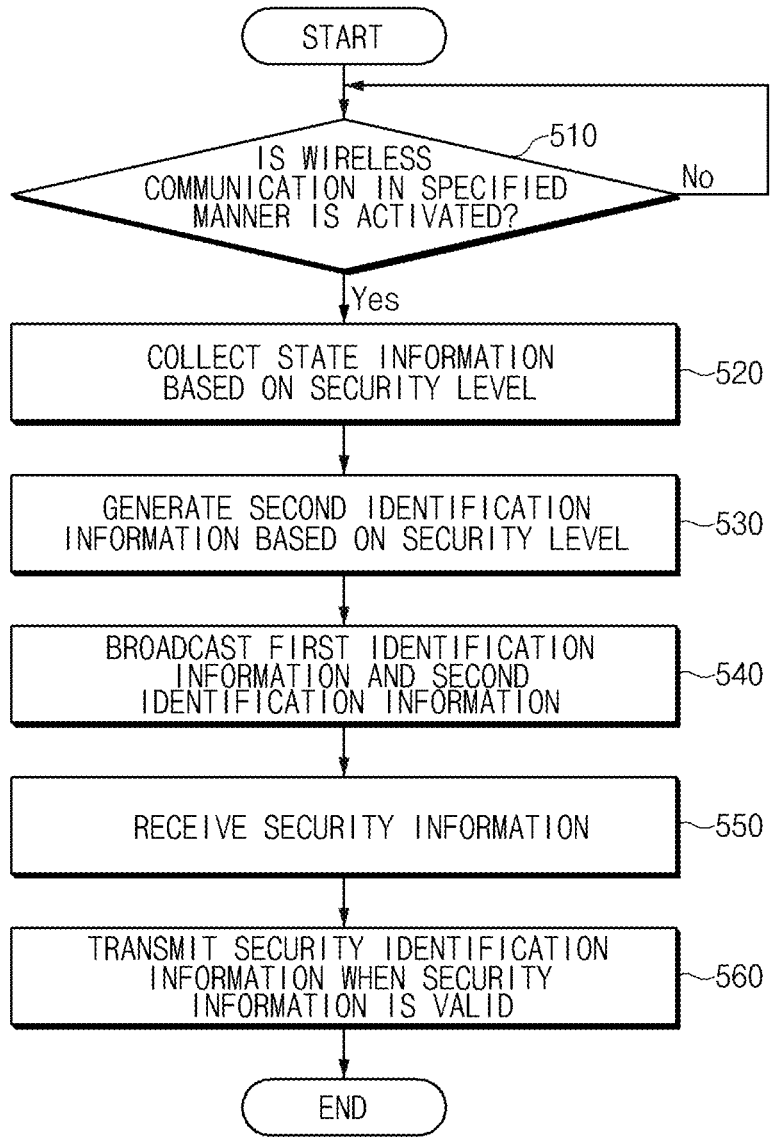
FIG. 5 illustrates a flowchart of generation of second identification information based on a security level in a second electronic device according to various embodiments.

FIG. 5 illustrates a flowchart illustrating generation of second identification information based on a security level in a second electronic device according to various embodiments.

Referring to FIG. 5, in operation 510, the second electronic device 101*a* (e.g., the processor or the control circuit of the second electronic device 101*a*) may determine whether the wireless communication in the specified manner is activated. For example, the specified manner may be the short-range wireless communication (e.g., the Bluetooth communication or Wi-Fi communication).

In operation 520, when the wireless communication in the specified manner is activated, the second electronic device 101*a* may collect the state information based on the security level. For example, the second electronic device 101*a* may separately collect state information of a first level (e.g., door open/close information) that requires a separate verification of security information and state information of a second level (e.g., lighting on/off information) that does not require the separate verification of the security information.

In operation 530, the second electronic device 101*a* may convert the collected state information based on the predetermined rule to generate the second identification information based on the security levels. For example, the second electronic device 101*a* may generate second identification information (hereinafter referred to as security identification information) including both the state information of the first level and the state information of the second level and second identification information (hereinafter referred to as general identification information) only including the state information of the second level.

According to various embodiments, operations 520 and 530 may be performed before operation 510.

In operation 540, the first identification information and the general identification information may be broadcasted.

In operation 550, when the first electronic device 101 requests the pairing, the security information may be received from the first electronic device 101. The security information may include a password, user account information or encryption information.

In operation 560, when the security information is valid, the second electronic device 101*a* may encrypt security identification information and transmit the encrypted security identification information to the first electronic device 101.

Figure 6:
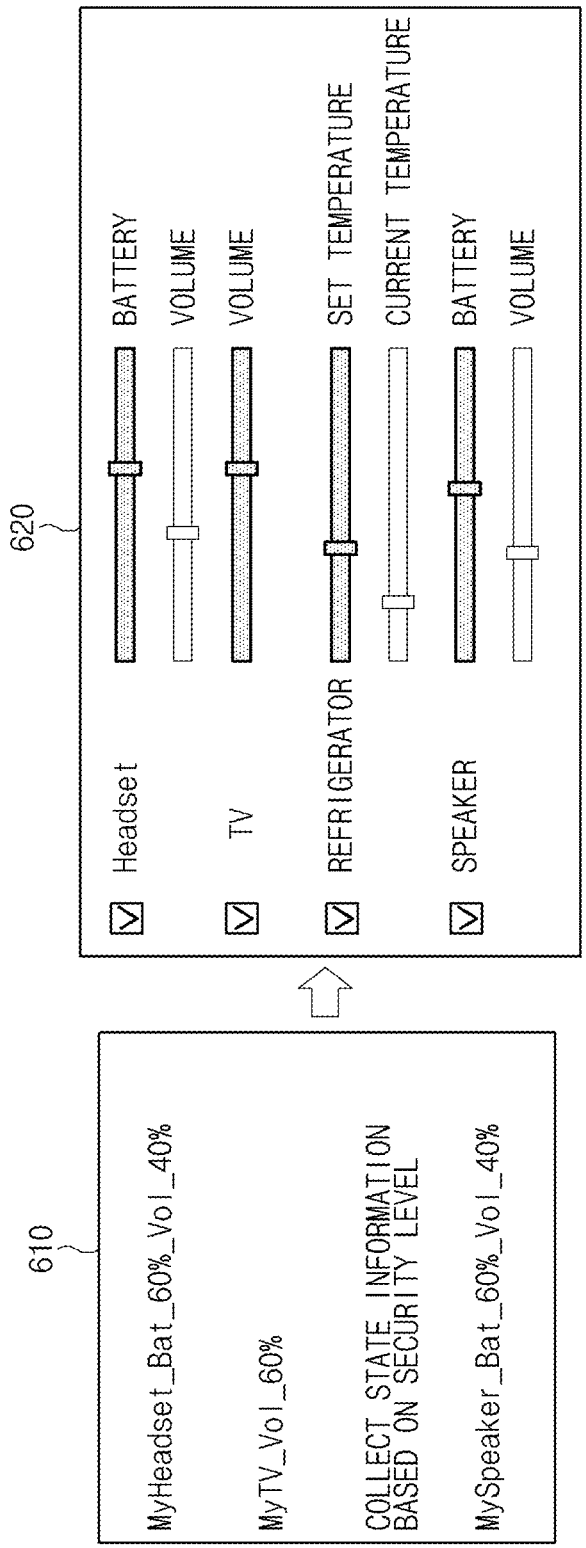
FIG. 6 illustrates a search list and a user interface for managing a second electronic device according to various embodiments.

FIG. 6 illustrates a search list and a user interface for managing a second electronic device according to various embodiments. FIG. 6 is illustrative and the present disclosure is not limited thereto.

Referring to FIG. 6, when there are the plurality of second electronic devices 101*a*, the first electronic device 101 may receive the first identification information and the second identification information from each of the second electronic devices 101*a*.

The first electronic device 101 may display a search list 610 about the second electronic devices 101*a* in which the received first identification information (e.g., the Bluetooth address) match the information stored in the memory.

The search list 610 may include the second identification information about the second electronic device 101*a*. The second identification information may be in a form in which the device name and the state information of the device are combined with each other.

The first electronic device 101 may display a user interface 620 that integrally manages the second electronic device 101*a* based on the search list 610. The first electronic device 101 may separate the second identification information included in the search list 610 from each other based on the specified rule to determine state information about each of the second electronic devices 101*a*.

The first electronic device 101 may display or update an object (e.g., a graph) included in the user interface 620 based on the determined state information.

The electronic device according to various embodiments disclosed in the disclosure may be various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technical features disclosed in the disclosure to the particular embodiment disclosed herein; rather, the disclosure should be construed to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in other aspect (e.g., the importance or the order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The term "module" used in the disclosure may include a unit implemented in hardware, software, or firmware and may be interchangeably used with the terms "logic", "logical block", "part" and "circuit". The "module" may be a minimum unit of an integrated part or may be a part thereof. The "module" may be a minimum unit for performing one or more functions or a part thereof. For example, according to an embodiment, the "module" may include an application-specific integrated circuit (ASIC).

An electronic device (e.g., the electronic device 101 in FIG. 2) according to various embodiments includes a communication circuit for supporting wireless communication in a specified manner, a processor, and a memory for storing instructions, wherein when the instructions are executed, the processor searches a peripheral external device when the wireless communication in the specified manner is activated, receives, from the external device, first identification information that is a fixed value unique to the external device and second identification information including a first portion including a name of the external device and a second portion including state information of the external device; and determines the state information of the external device based at least partially on the second portion when the first identification information corresponds to information stored in the memory.

According to various embodiments, the instructions may allow the processor to display an object of a user interface of an application that controls the external device based on the determined state information. The instructions may allow the processor to perform pairing using the first identification information after displaying the object.

According to various embodiments, the instructions may allow the processor to display a list including the second identification information on a display.

According to various embodiments, the second portion may have a plurality of state indications with different attributes.

According to various embodiments, the instructions may allow the processor to select one of a plurality of rules stored in the memory based on the first identification information. The rule may be received from the external device and stored in advance, or downloaded from an external server and stored in advance.

According to various embodiments, the instructions may allow the processor to activate the wireless communication when a specified application is executed.

According to various embodiments, the specified manner may be either Bluetooth communication or Wi-Fi communication.

An electronic device according to various embodiments includes a display, a communication module, a sensor module, and a processor that identifies an external device connectable using the communication module, obtains identification information changed based on at least one of state information of the external device or setting information of the external device recognized by the external device, and displays the obtained identification information using the display.

According to various embodiments, the processor may separate portions related to the state information or the setting information from the obtained identification information and determine the state information of the external device based on the separated portions. The processor may display an object of a user interface of an application that controls the external device based on the determined state information in the display. The processor may perform pairing with the external device after displaying the object.

According to various embodiments, the processor may activate specified wireless communication using the communication module when a specified application is executed.

According to various embodiments, the processor may select one of a plurality of rules stored in a memory based at least partially on the identification information. The processor may obtain the plurality of rules from the external device or an external server and store the obtained plurality of rules in the memory.

An electronic device (e.g., the electronic device 101a in FIG. 2) according to various embodiments includes a sensor module, a communication module, and a processor that identifies at least one of state information of the electronic device or setting information of the electronic device recognized using the sensor module; and changes identification information of the electronic device corresponding to the state information or the setting information, wherein the identification information of the electronic device is able to be identified by an external device for establishing connection with the electronic device.

According to various embodiments, the electronic device may further include a sound output device, and the processor may collect volume information about output of the sound output device and change the identification information corresponding to the state or setting information and the volume information. The changed identification information is text data within a specified size.

According to various embodiments, the processor may identify a preset security level and change the identification information further based on the security level.

A wireless communication method according to various embodiments may include determining whether wireless communication, which is performed in the electronic device and in the specified manner, is activated, searching for a peripheral device, receiving first identification information and second identification information from the external device, wherein the first identification information is a fixed value unique to the external device and the second identification information includes a first portion including a name of the external device and a second portion including state information of the external device, and determining the state information of the external device based on a specified rule and based on the second portion when the first identification information matches information stored in the memory.

Various embodiments of the disclosure may be implemented by software (e.g., the program 140) including an instruction stored in a machine-readable storage medium (e.g., an internal memory 136 or an external memory 138) readable by a machine (e.g., the electronic device 101). For example, the processor (e.g., the processor 120) of a machine (e.g., the electronic device 101) may call the instruction from the machine-readable storage medium and execute the instructions thus called. This means that the machine may perform at least one function based on the called at least one instruction. The one or more instructions may include a code generated by a compiler or executable by an interpreter. The machine-readable storage medium may be provided in the form of non-transitory storage medium. Here, the term "non-transitory", as used herein, means that the storage medium is tangible, but does not include a signal (e.g., an electromagnetic wave). The term "non-transitory" does not differentiate a case where the data is permanently stored in the storage medium from a case where the data is temporally stored in the storage medium.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

According to various embodiments, each component (e.g., the module or the program) of the above-described components may include one or plural entities. According to various embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to various embodiments, operations performed by a module, a programming, or other components may be executed sequentially, in parallel, repeatedly, or in a heuristic method, or at least some operations may be executed in different sequences, omitted, or other operations may be added.

The electronic device according to various embodiments disclosed in the disclosure may determine an operation state or setting state of the wearable device or the IoT device using the identification information combining the name and the state information of the external device with each other without a separate pairing or data transmission and reception process.

The electronic device according to various embodiments disclosed in the disclosure may display, without waiting for the pairing process for each of the plurality of wearable devices or IoT devices, the state information of each of the plurality of wearable devices or IoT devices.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device capable of being connected to an external device via wireless communication, the electronic device comprising:
a communication circuit configured to support a Bluetooth communication;
a display;
a processor; and
a memory for storing instructions,
wherein the instructions, when executed by the processor, cause the processor to:
search an external device when the Bluetooth communication is activated;
receive, from the external device via the Bluetooth communication, first identification information that is a value unique to the external device and second identification information including a first portion including a name of the external device and a second portion including state information of the external device and setting information of the external device;
determine an operational state of the external device based at least partially on the second portion when the first identification information corresponds to information stored in the memory; and
before being paired with the external device, display a list including the name and a user interface to adjust the setting information of the external device using the second identification information on the display, and
wherein the setting information is a set temperature or a set volume.

2. The electronic device of claim 1, wherein the instructions, when executed by the processor, cause the processor to:
perform pairing using the first identification information after displaying the list.

3. The electronic device of claim 1, wherein the second portion has a plurality of state indications with different attributes.

4. The electronic device of claim 1, wherein the instructions, when executed by the processor, cause the processor to:
select one of a plurality of rules stored in the memory based on the first identification information.

5. The electronic device of claim 4, wherein the one of the plurality of rules selected is received from the external device and stored in advance, or downloaded from an external server and stored in advance.

6. The electronic device of claim 1, wherein the instructions, when executed by the processor, cause the processor to:
   activate the Bluetooth communication when a specified application is executed.

7. An electronic device comprising:
   a display;
   a communication module configured to support a Bluetooth communication;
   a sensor module; and
   a processor configured to:
      identify an external device connectable via the Bluetooth communication;
      obtain, via the Bluetooth communication, identification information changed based on state information of the external device and setting information of the external device recognized by the external device; and
      before being paired with the external device, display a list including a name and a user interface to adjust the setting information of the external device using the obtained identification information using the display,
   wherein the setting information is a set temperature or a set volume.

8. The electronic device of claim 7, wherein the processor is configured to:
   separate portions related to the state information or the setting information from the obtained identification information; and
   determine an operational state of the external device based on the separated portions.

9. The electronic device of claim 7, wherein the processor is configured to:
   perform pairing with the external device after displaying the list.

10. The electronic device of claim 7, wherein the processor is configured to:
    activate specified wireless communication using the communication module when a specified application is executed.

11. The electronic device of claim 7, wherein the processor is configured to:
    select one of a plurality of rules stored in a memory based at least partially on the identification information.

12. The electronic device of claim 11, wherein the processor is configured to:
    obtain the plurality of rules from the external device or an external server and store the obtained plurality of rules in the memory.

\* \* \* \* \*